United States Patent

Boozer

[11] Patent Number: 5,133,293
[45] Date of Patent: Jul. 28, 1992

[54] LIVESTOCK FEEDING STATIONS

[76] Inventor: John D. Boozer, 336 NE. 44th Ave., Ocala, Fla. 32670

[21] Appl. No.: 301,384

[22] Filed: Jan. 25, 1989

Related U.S. Application Data

[63] Continuation-in-part of Ser. No. 210,264, Jun. 23, 1988, abandoned.

[51] Int. Cl.$^5$ .................. A01K 1/10; A01K 5/00; A01K 39/00
[52] U.S. Cl. ........................................ 119/61
[58] Field of Search ................. 119/61, 18, 51.5; 248/220.1, 213.2, 312.1

[56] References Cited

U.S. PATENT DOCUMENTS

| | | | |
|---|---|---|---|
| 57,212 | 3/1921 | Carter | 119/61 |
| 150,423 | 5/1874 | Link et al. | 119/61 |
| 303,043 | 8/1884 | Pierce | 119/61 |
| 410,563 | 9/1889 | Seward . | |
| 439,298 | 10/1890 | Hutter | 119/61 |
| 459,032 | 9/1991 | Worthley | 119/61 |
| 712,919 | 11/1902 | Faust et al. | 119/61 |
| 1,102,371 | 7/1914 | Warren . | |
| 1,259,790 | 3/1918 | Shirley . | |
| 1,463,063 | 7/1923 | Rysdon | 119/61 |
| 2,658,709 | 11/1953 | Kendall | 119/61 |
| 2,813,509 | 11/1957 | Bruno | 119/61 |
| 3,205,860 | 9/1965 | Moore | 119/52 |
| 3,205,861 | 9/1965 | Moore | 119/61 |
| 3,329,321 | 7/1967 | Moore | 222/465 |
| 3,622,036 | 11/1971 | Bongaerts | 119/61 X |

FOREIGN PATENT DOCUMENTS

| | | | |
|---|---|---|---|
| 690873 | 7/1964 | Canada | 119/61 |
| 695990 | 8/1953 | United Kingdom | 119/61 |

Primary Examiner—Robert P. Swiatek
Assistant Examiner—Nicholas D. Lucchesi

[57] ABSTRACT

A livestock feeding station has a feeding trough with a series of spaced deflector members extending substantially the entire depth of the trough. The upper edge of the trough has a rounded section to prevent livestock from gripping with their teeth. The station can be ground mounted or removably attached to a stall with attachments.

8 Claims, 4 Drawing Sheets

LIVESTOCK FEEDING STATIONS

CROSS-REFERENCE TO RELATED CASES

This application is a continuation-in-part application of application Ser. No. 210,264, filed Jun. 23, 1988, and now abandoned.

BACKGROUND OF THE INVENTION

1. Field of the Invention

The invention is directed to livestock feeders and in particular to livestock feeders adapted to be used on the ground or mounted off the ground in stalls or on fences.

2. Related Art

Livestock feeders used on the ground are usually designed with a special shape, such as bucket-shaped, that are adapted to sit on the ground or to be mounted within old auto tires to keep the livestock, such as horses, from tipping over the feeder. Livestock feeders have also been rectangularly or square-shaped to sit directly on the ground and which provide inadequate drainage after a rain. Typically, known livestock feeders have smooth inside walls that slope outwardly enabling the livestock, and in particular horses, to rake the feed out with their nose. Such feeders are also susceptible to being overturned by the hooves of the livestock.

Stall type livestock feeders are adapted to be hung from brackets or otherwise suspended by hooks or snaps connecting through I-bolts or U-bolts in the feeding trough. Wire brackets or plastic rings are mounted around the top rim of the feeders to keep the livestock from scooping grain over the side of the feeder. However, such wire brackets or plastic rings are very dangerous as haltered livestock, and in particular horses, can become hung on the feeder by the halter snagging the brackets or plastic rings. Moreover, should the livestock succeed in getting a hoof over the rim of the bracket, injury may result to the hooves or legs when the animal attempts to extract itself from the feeder.

U.S. Pat. No. 439,298 (Hutter) discloses a manger A which can be mounted on two vertically spaced apart support plates D mounted in a corner between two walls B and C, the manger including a diagonal side 4 that extends between the two sides 2 and 3 and two vertically spaced apart fingers F which are attached to the diagonal side 4 and are respectively mountable on the support plates D.

U.S. Pat. No. 1,102,371 (Warren) discloses a rectangular feed box which is pivotally mounted within a supporting frame that can be mounted in a corner between two walls.

U.S. Pat. No. 1,259,790 (Shirley) discloses a generally rectangular feed manger which is pivotally mountable within a frame which can be attached to a wall.

U.S. Pat. No. 2,658,709 (Kendall) discloses a bowl-shaped animal feeder which uses tapered ribs 2 on its inner surfaces to prevent loss of feed due to "nosing" by the feeding animal.

U.S. Pat. No. 3,205,861 (Moore) discloses a feed tub 10 which can be mounted on two converging wood beams 18 and 19 by bolts 15, 16 and 17 which also retain a feed saver ring 30 in the tub.

U.S. Pat. No. 3,329,321 discloses a watering pail 10 which can be mounted in a corner between two walls by a bail 20 that is attached to both walls.

SUMMARY OF THE INVENTION

The ground and stall feeding stations of the present invention are preferably formed of high molecular weight polyethylene copolymer. The ground feeding station is designed with a flanged bottom to resist tilting, with the outer rim of the flange ridged to help maintain the bottom of the trough portion of the feeding station off the ground, thereby enabling water to drain from the trough after a rain. Raised deflectors extending from the inside walls of the feeding station prevent the livestock from raking grain out, as the nose of the livestock hits the raised deflectors and the feed grain falls back into the trough of the feeding station. The feeding station is formed without sharp corners or projections, thereby preventing injury to the livestock contacting the feeding station.

The stall type feeding station is designed to be mounted in a corner of the stall with either a single wall bracket and a spring-loaded snap tight lock in each diametrically opposed corner of the trough, or conventional U-bolts. The inside walls of the trough portion of the feeding station also include similar nose deflectors as in the ground type feeding station, thereby eliminating the need for the potentially dangerous rings and wire brackets. The top rim of the stall type feeding station may extend downwardly approximately 1½ inches to strengthen and stabilize the trough in the corners, to eliminate any sharp edges and provide a bumper for the feeding station.

While the preferred method of construction of the feeding stations is to use a vacuum formation process using high molecular weight polyethylene copolymer, injection molding processes using other types of plastics could also be used.

The nose deflectors should preferably be rounded or V-shaped to provide strength and to prevent injury to the nose of the livestock.

The shape of the feeding station can be altered to accommodate mounting on a fence or the flat wall of a stall.

BRIEF DESCRIPTION OF THE DRAWINGS

The above, features, objects and advantages of the invention are readily apparent from a consideration of the following description of the best mode of carrying out the invention when taken in conjunction with the figures, wherein.

DETAILED DESCRIPTION

Figure 1:
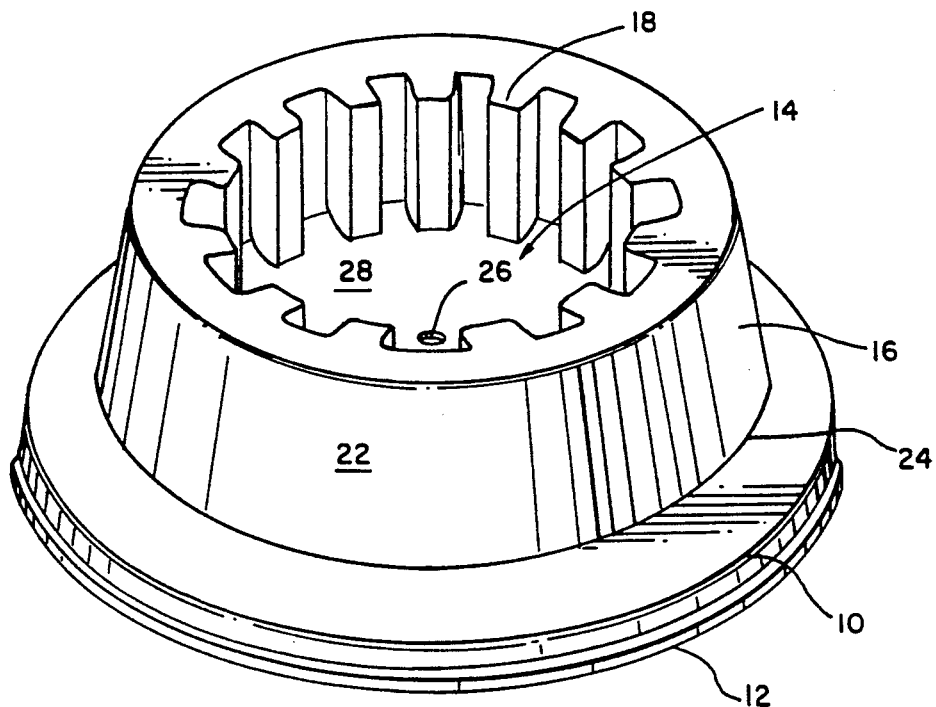
FIG. 1 shows a perspective view of a ground type livestock feeding station in accordance with the invention.

The perspective view of the ground type livestock feeding station shown in FIG. 1 shows the raised ridge portion 10 having an edge portion 12 for contact with the ground. The raised ridge 10 holds the bottom of the feeding station off the ground thereby enabling water to drain from the feeding station. Raised ridge portion is somewhat flexible to also assist in resisting tilting of the feeding station. The trough 14 is formed within a raised portion 16 and includes a plurality of nose deflectors 18 extending around the inner periphery of the trough. Top rim portion 20 is designed to prevent the livestock from gripping with their teeth. The side walls 22 forming trough portion 16 are sloped to resist tilting of the feeding station. The bottom portion 24 of trough portion 16 is rounded and somewhat flexible to absorb shocks to the feeding station when it is struck by the hooves of livestock and also to aid in resisting the tendency of the feeding station to tilt.

A hole 26 is drilled in the bottom 28 of trough 16 to enable drainage of water and moisture from the feeding station. Drainage of water may be aided by bottom 28 having a slight downward slope towards drainage hole 26.

Figure 2:
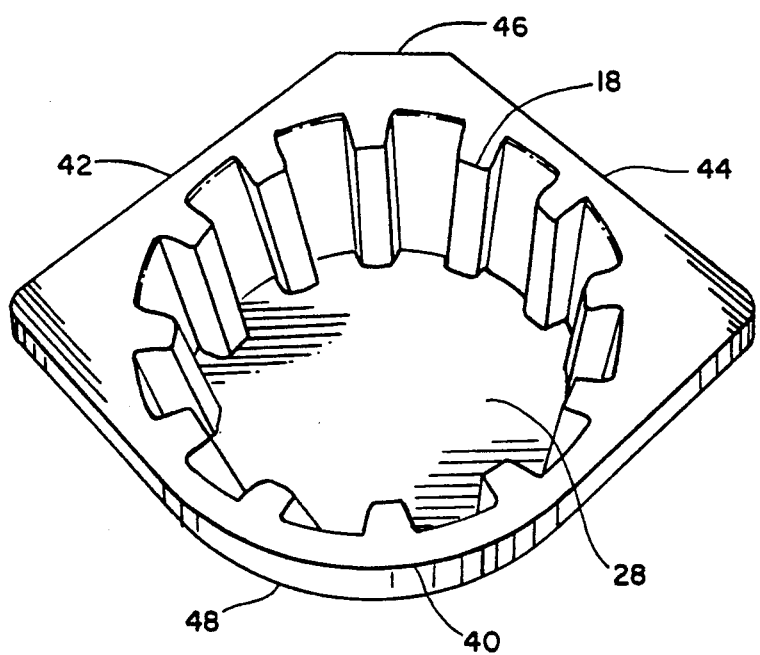
FIG. 2 is a perspective view of a stall type livestock feeding station in accordance with the invention.

FIG. 2 illustrates a perspective view of a preferred embodiment of a stall type livestock feeding station having the same general characteristics as the ground type livestock feeding station shown in FIG. 1. However, the trough portion is inverted and includes a top portion having a rounded front section 48 and sloping side sections 42 and 44 terminating in a truncated back section 46. Front portion 48 and side portions 42 and 44 have a flange extending approximately 1½ inches downwardly as illustrated in FIG. 2 to aid in strengthening the feeding station and to provide a bumper for livestock butting up against the feeding station.

The trough portion extends downwardly from the top portion and includes a plurality of equally spaced deflector members extending substantially the entire depth of the trough portion. The truncated back section or portion can further include a projecting member extending outwardly for engagement with a mounting bracket and each respective front corner can include a mounting means.

Figure 3:
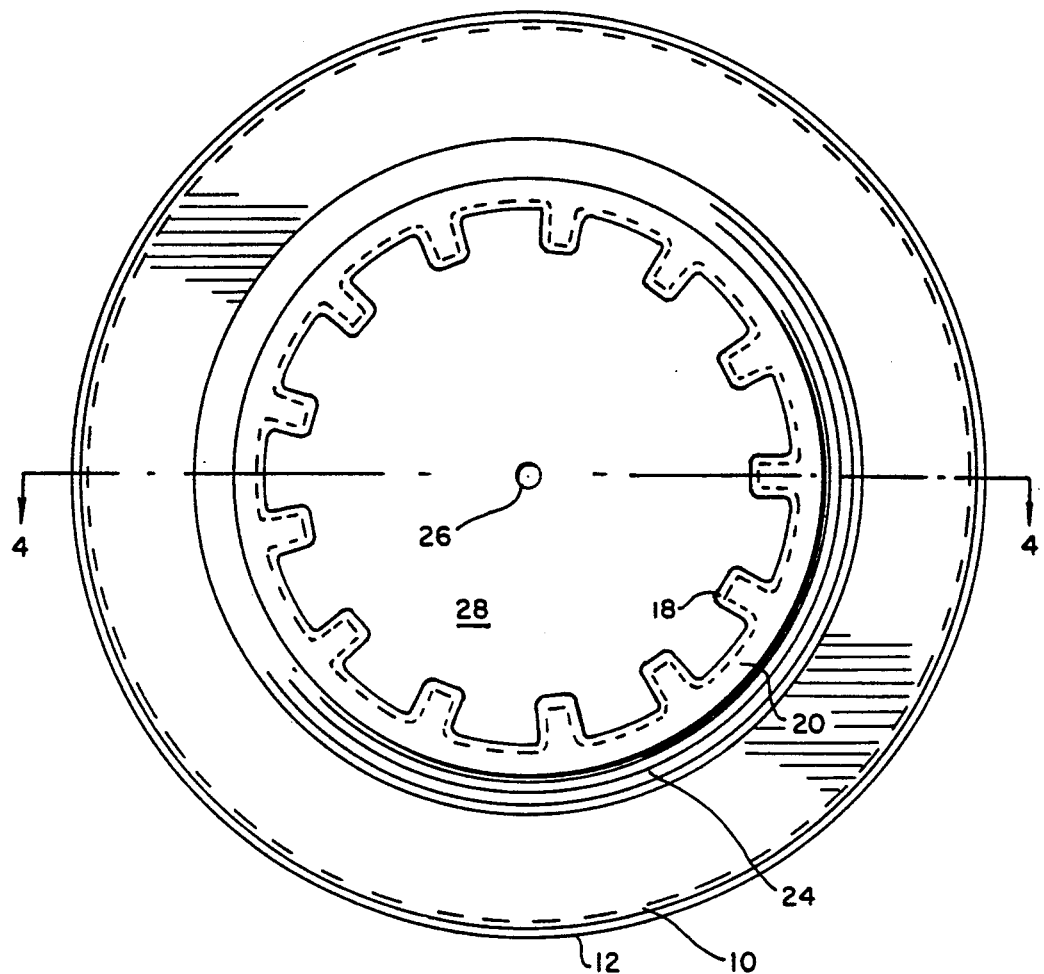
FIG. 3 is a top view of the ground type livestock feeding station.

The top view of the feeding station shown in FIG. 3 illustrates the general shape of the plurality of nose deflectors 18 that are equally spaced around the inner periphery of the trough portion of the feeding station. In a preferred embodiment of the ground type feeding station, the nose deflectors 18 are each approximately 1¼ inch wide and approximately 2½ inches long and extend approximately from the top rim 20 to the bottom of the trough portion of the feeding station. In the embodiment shown in FIG. 3 there are thirteen nose deflectors 18 formed around the inner periphery of the trough portion.

Typical dimensions of a preferred embodiment of the ground type feeding station are a 29 inch diameter base, 7 inch deep trough 16, a 19 inch diameter at the top rim portion 20 and a 16½ inch inner diameter of trough portion 16. The above dimensions provide approximately a four gallon capacity.

Figure 4:
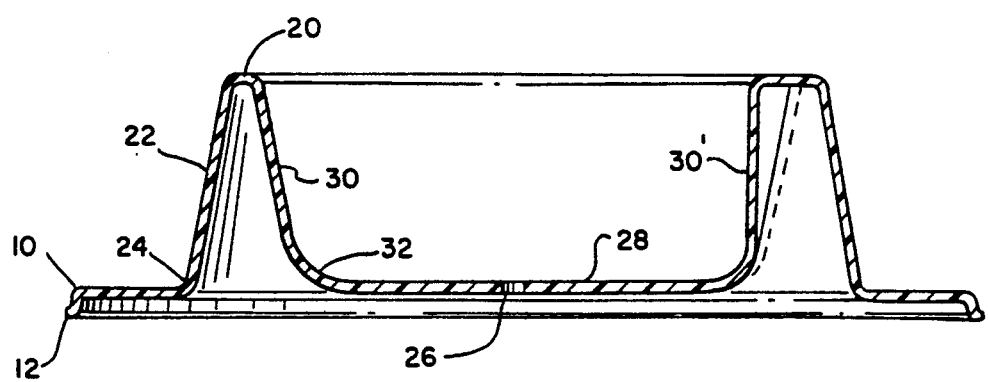
FIG. 4 is a section of the ground type livestock feeding station taken along lines 4—4 of FIG. 3.

The cross-sectional view of the ground type feeding station shown in FIG. 4 serves to illustrate the general overall shape of the feeding station for both the ground and stall types. The wall thickness of the feeding station may vary from ⅛ inch to ¼ inch with the former dimension preferably occurring at and between ridge portions 10 and 24 and the latter dimension existing in the bottom 26 of the trough portion of the feeding station. Sides 22 are preferably sloped at approximately 10 degrees as shown in FIG. 4 with the inner wall sloped inwardly and the outer wall sloped outwardly. The inner wall 30 of the trough may also be sloped at approximately 10 degrees, or as illustrated in the right side of FIG. 4, such inner wall may also be essentially vertical as shown at 30'.

Ridge 10 is preferably formed with a ⅛ inch radius; ridge 24 with a ½ inch radius and the inner rounded portion 32 of the trough with a 2 inch radius.

In addition to providing a virtually tip-resistant feeding station that is rugged and designed to provide injury-proof use for livestock, the feeding station of the present invention also helps prevent sand colic and saves feed by preventing deflection of feed from the feeding station by the specially designed nose deflectors.

Figure 5A:
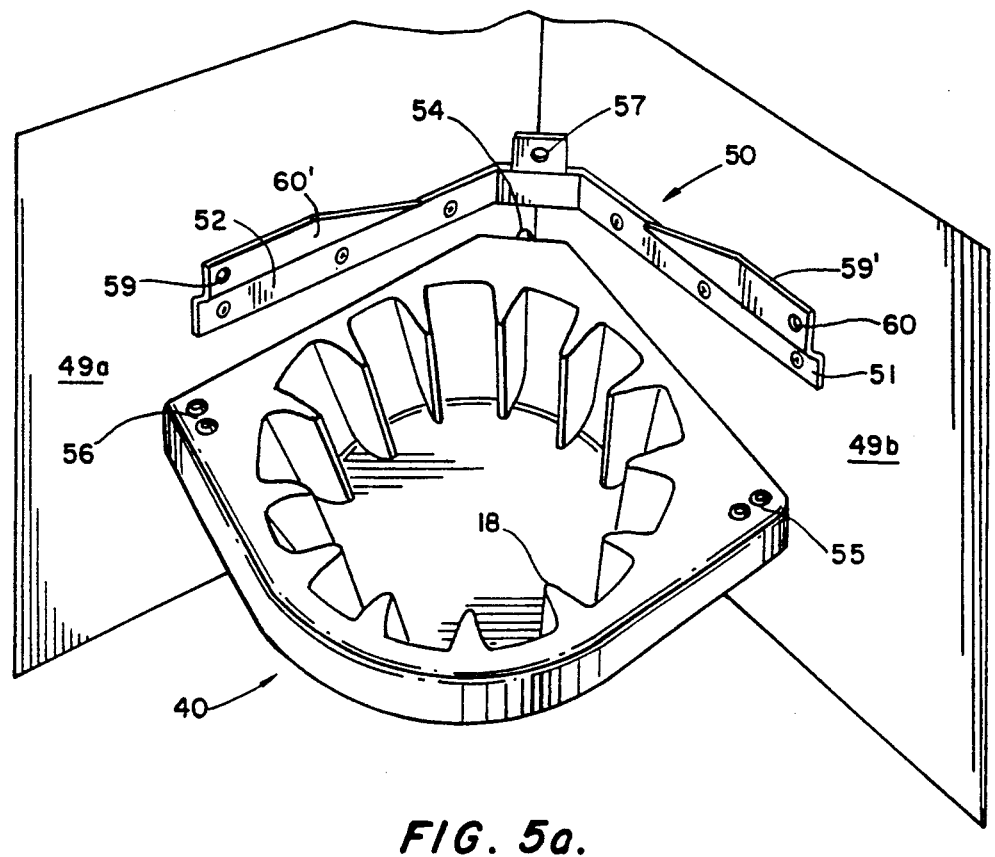
FIG. 5a shows the bracket mounted to a corner of a stall and the corner feed station in position to be mounted to the wall bracket.

FIG. 5a shows bracket 50 screwed or nailed in a corner formed by walls 49a and 49b. Bracket 50 also includes respective arms 51 and 52 with mounting hole 57 located in truncated portion 54 at the junction of the arms 51 and 52, and respective mounting holes 59 and 60 at each respective end of the feeding station 40. Mounting holes 59 and 60 are formed in each of inwardly directed projections 59' and 60' of the mounting bracket 50. Corner feed station 40 includes a projection 54 mounted in the approximate center of truncated back section 46 as well as a single snap type spring-loaded pin lock mounted respectively at positions 55 and 56 of feeding station 40.

Figure 5B:
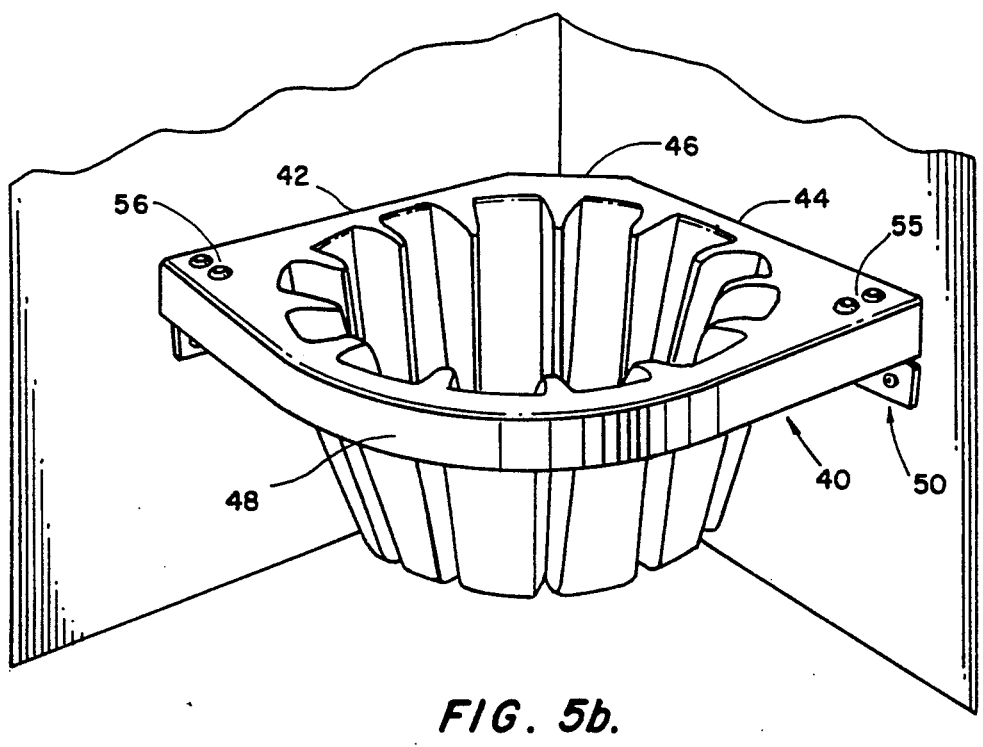
FIG. 5b shows the corner feed station mounted to the wall of the stall.

FIG. 5b shows the corner feeding station of FIG. 5a mounted to wall bracket 50 by the insertion of projecting guide pin 54 in the hole 58 of bracket 50, and the respective projection of each of the snap locks positioned at locations 55, 56 within respective holes 59, 60 of the wall bracket. The corner feed station can be removed from wall bracket 50 simply by withdrawing the projections of each of snap locks 55 and 56 against their spring bias from the respective hole 59 and 60 of the wall bracket and also withdrawing pin 54 from hole 57 of the wall bracket.

The above mounting of the feeding station is very simple, leaving no outwardly extending projections that might cause injury to the livestock as the locking members at each corner of the feeding station are not exposed and projection 54 at the back extends toward the corner between walls 51 and 52.

Figure 6:
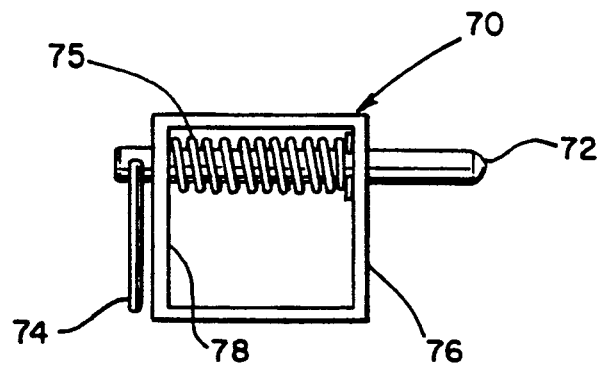
FIG. 6 is a detail view of the spring-loaded snap locks used to retain the corner feeding station on the wall bracket.

FIG. 6 illustrates the construction of a snap lock 70 including projection 72 ring handle 74 and spring 75 between legs 76 and 78. Projection 72 is normally biased by spring 75 as shown in FIG. 6. projection 72 can be withdrawn by pulling on ring handle 74, thereby disengaging projection 72 of the spring lock from a mounting hole in the bracket as described above.

Figure 7:
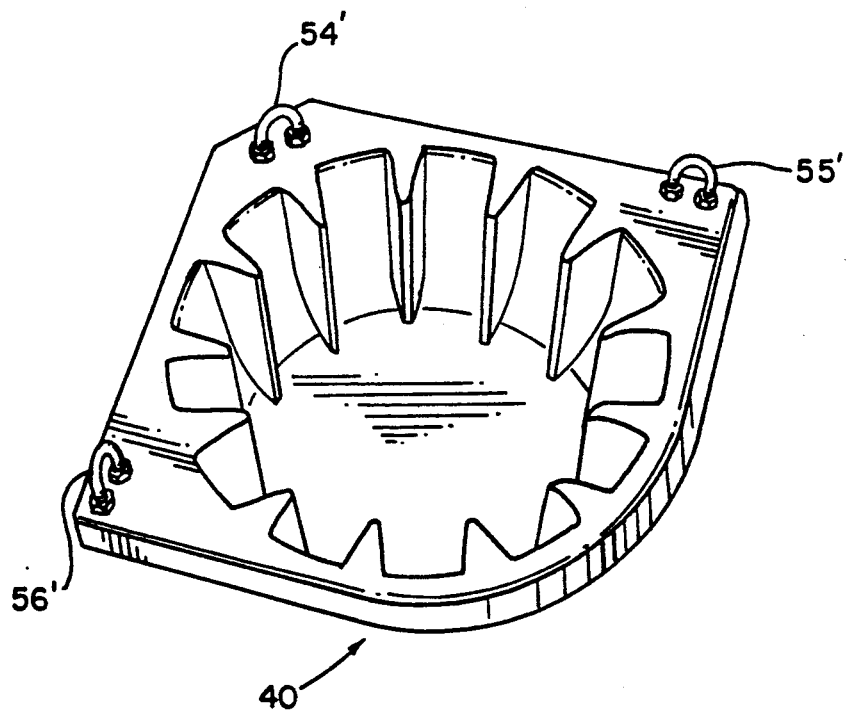
FIG. 7 shows a corner feed station with U-bolts mounted for attachment to the corner of a stall.

FIG. 7 shows a corner type feeding station 40 including U-bolts 54', 55' and 56" for attachment to the wall of a stall in a conventional manner.

The above description of preferred embodiments of a feeding station is not to be taken as limiting the scope of the invention, as those skilled in the livestock feeding station art will readily perceive various modifications of the feeding station. The scope of the invention is intended to be limited only by the accompanying claims and the equivalents of the various components recited therein.

What is claimed is:

1. A livestock feeding station, comprising:
a base portion including a flexible ridge having a downward sloping side extending around the periphery thereof;
a trough portion extending from said base portion by a rounded flexible portion having sloping external wall and said trough portion having an inner wall including a plurality of equally spaced deflector members extending substantially the entire depth of said trough portion and said inner wall being connected to said sloping external wall by a rounded section; and
a bottom portion of said trough portion being suspended above the lower-most portion of said base portion and including a hole for drainage of liquid.

2. A livestock feeding station as claimed in claim 1, wherein the inner and external walls of said trough portion are sloped approximately 10 degrees.

3. A livestock feeding station as claimed in claim 1, wherein the external wall of said trough portion is sloped and the inner wall is substantially vertical.

4. A livestock feeding station as claimed in claim 1, wherein the base portion is adapted to rest on the ground.

5. A livestock feeding station, comprising:
a top portion including a rounded front section, a sloping side section formed at each ed of said rounded front section and the sides of said front section and each of said sloping side sections forming a respective corner and the ends of said sloping side section forming a truncated portion therebetween and a downwardly extending flange around said front and sloping side sections;
a trough portion extending downwardly from said top portion and including a plurality of equally spaced deflector members extending substantially the entire depth of said trough portion;
said truncated portion including a projecting member extending outwardly therefrom; and
each respective corner including attachment means.

6. A livestock feeding station, comprising:
a top portion including a rounded front section, a sloping side section formed at each end of said rounded front section and the sides of said front section and each of said sloping side sections forming a respective corner and the ends of said sloping side section forming a truncated portion therebetween and a downwardly extending flange around said front and sloping side sections;
a trough portion extending downwardly from said top portion and including a plurality of equally spaced deflector members extending substantially the entire depth of said trough portion;
said truncated portion including a projecting member extending outwardly therefrom;
each respective corner including a mounting means
a bracket for mounting a feeding station, comprising two arm members extending substantially 90 degrees from one another and including mounting holes along each of said arm members and respective end portions formed by a flange portion extending inwardly and upwardly and each end portion including a mounting hole for engagement with said mounting means; and
the juncture of said arm members being formed as a truncated portion including an upstanding member with a mounting hole therein for engagement with said projecting member.

7. The livestock feeding station as claimed in claim 6, wherein each of said mounting means is a snap type lock.

8. The livestock feeding station as claimed in claim 6, wherein each of said mounting means is a U-bolt.

* * * * *

UNITED STATES PATENT AND TRADEMARK OFFICE
CERTIFICATE OF CORRECTION

PATENT NO. : 5,133,293
DATED : July 28, 1992
INVENTOR(S) : John D. Boozer

It is certified that error appears in the above-identified patent and that said Letters Patent is hereby corrected as shown below:

Column 3, line 34, after "flange" insert ---40---.

Column 4, line 3, change "26" to ---28---.

Column 4, line 36, after "54" insert ---(not shown)---.

Column 4, line 36, change "58" to ---57---.

Column 4, line 54, change "projection" to ---Projection---.

Column 4, line 59, change ---56"--- to ---56'---.

Column 5, line 31, change --ed-- to --end--.

Signed and Sealed this

Nineteenth Day of January, 1993

*Attest:*

DOUGLAS B. COMER

*Attesting Officer*      Acting Commissioner of Patents and Trademarks